July 17, 1962
H. BOTTNER
3,044,793
BASE FOR CORE DRILLS
Filed Oct. 7, 1958
2 Sheets-Sheet 1
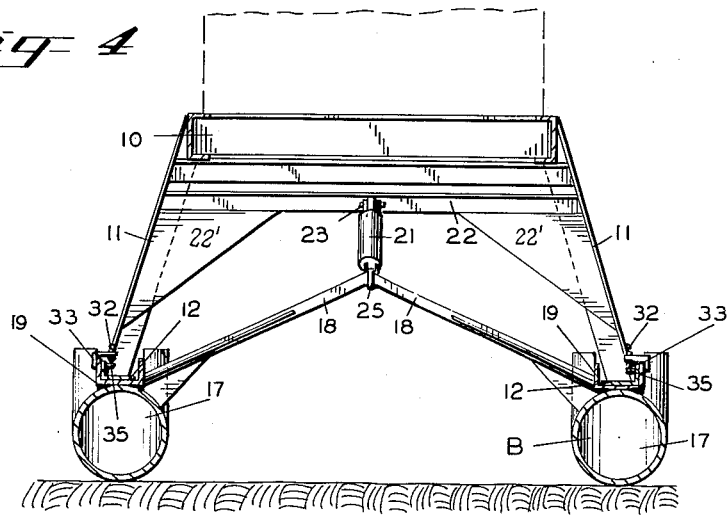
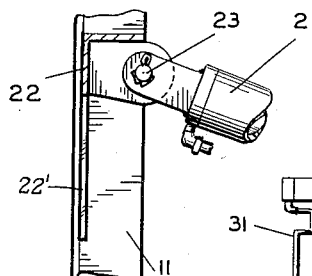
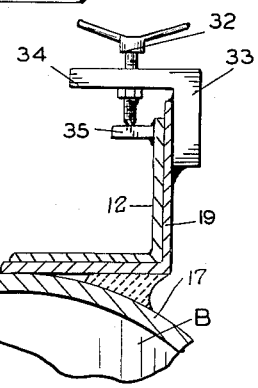
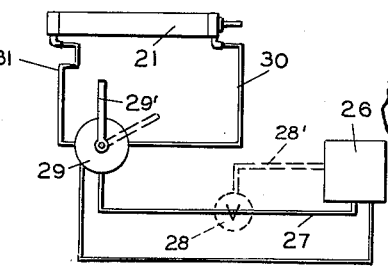
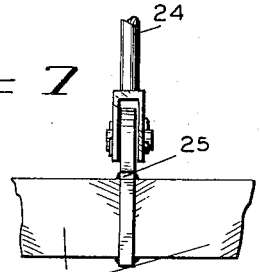
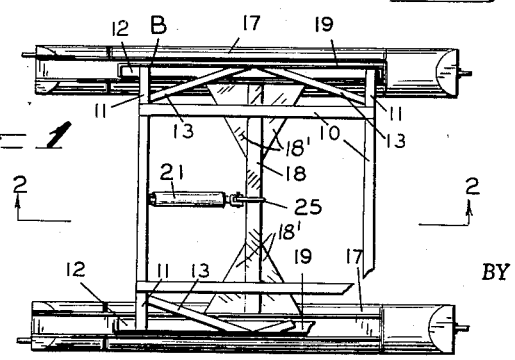
INVENTOR.
HAAKON BOTTNER
BY
Kimmel & Crowell
ATTORNEYS July 17, 1962  H. BOTTNER  3,044,793
BASE FOR CORE DRILLS
Filed Oct. 7, 1958  2 Sheets-Sheet 2
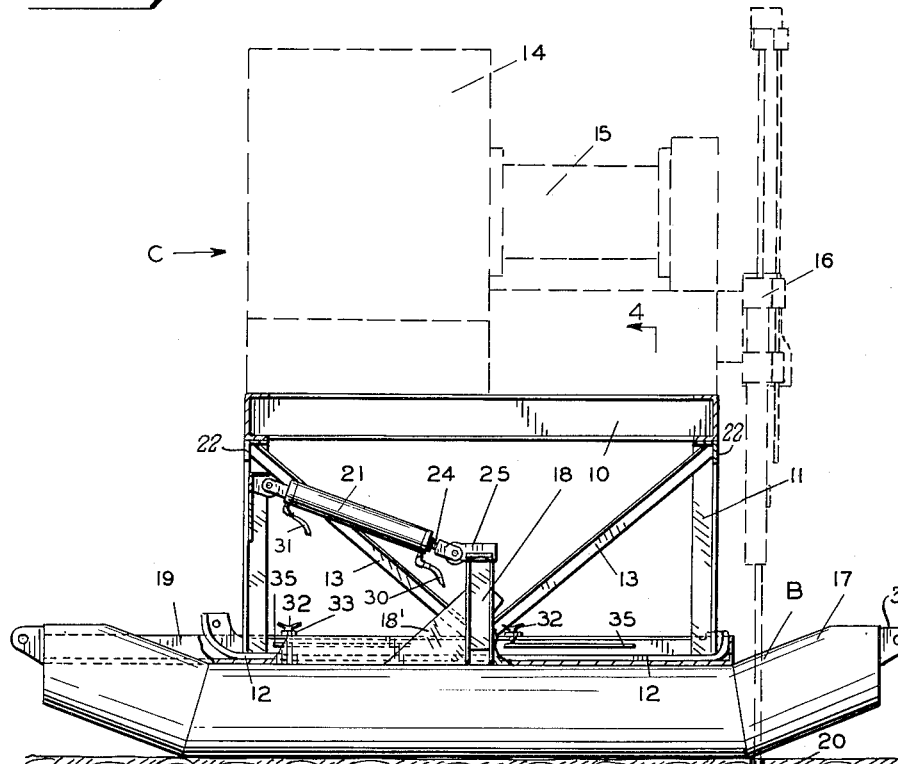
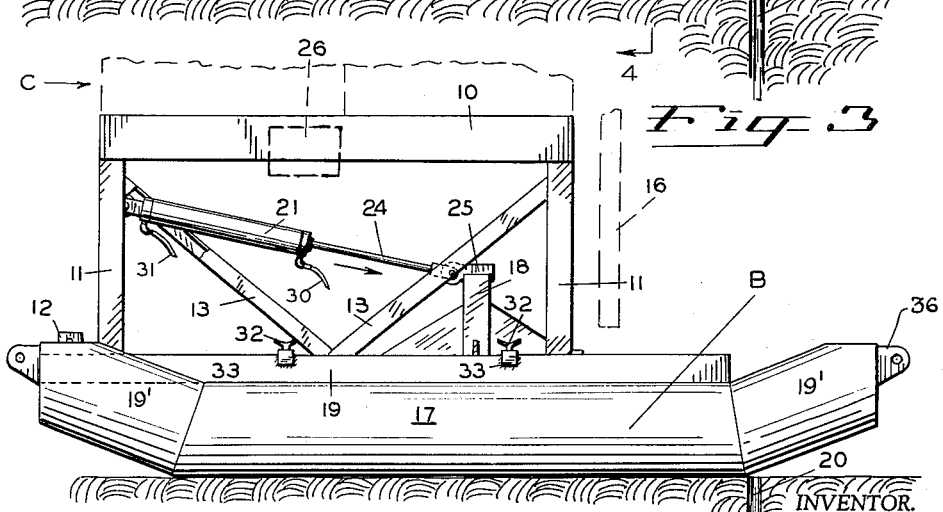
INVENTOR.
HAAKON BOTTNER
BY
Kimmel & Crowell
ATTORNEYS

United States Patent Office 3,044,793
Patented July 17, 1962

3,044,793
BASE FOR CORE DRILLS
Haakon Bottner, 11544 NE. Glisan, Portland, Oreg.
Filed Oct. 7, 1958, Ser. No. 765,787
4 Claims. (Cl. 280—12)

The present invention relates to improved bases upon which core drills are to be mounted.

The primary object of the invention is to provide an adjustable base upon which is adapted to be mounted core drills enabling the operator to move the core drill by hydraulic power means, into and out of alignment with the holes being drilled in the operation of the machine. In the operation of core drills, it is desirable to withdraw the drill and move the drill operating head of the machine into and out of alignment with the hole being drilled to permit the lowering of other implements, or the placing of casings in the drilled hole. Heretofore the operators were forced to use crowbars, or the like, to move the core machine away from the hole being drilled, consuming considerable time in performing this operation. With this new and improved base, the operator merely operates a control lever and a power hydraulic cylinder moves the core drill out of alignment or into alignment with the hole being drilled, almost instantly.

Other objects and advantages will become apparent in the following specification when considered in the light of the attached drawings, in which:

FIGURE 1 is a plan view of the invention with the core drill removed therefrom;

FIGURE 2 is an enlarged vertical sectional view taken on the line 2—2 of FIGURE 1, looking in the direction of the arrows, with the core drill, shown in broken lines, in position for drilling;

FIGURE 3 is a side elevational view illustrating the core drill in broken lines moved to one side of the hole being drilled;

FIGURE 4 is a vertical sectional view, taken on line 4—4 of FIGURE 2, looking in the direction of the arrows;

FIGURE 5 is an enlarged fragmentary detail sectional view of the locking mechanism for holding the frame of the core drill in a fixed location;

FIGURE 6 is a fragmentry enlarged detail view illustrating the hydraulic cylinder connected to the frame of the core drill;

FIGURE 7 is an enlarged fragmentary plan view, illustrating the piston rod of the hydraulic cylinder connected to a bracket on the base; and FIGURE 8 is a diagrammatical illustration of the hydraulic cylinder fluid control system.

Referring now to the drawings in detail wherein like reference characters indicate like parts throughout the several figures, the reference character B indicates generally a core drill base constructed in accordance with the invention.

The core drill base B includes a horizontally disposed generally rectangular frame 10 supported on opposed pairs of legs 11 having their lower ends rigidly secured to a pair of spaced parallel runners 12. Diagonal bracing 13 binds the frame 10, legs 11 and the runners 12 into a rigid support for supporting a core drill C thereupon, illustrated by broken lines in the drawing. Angle iron cross-members 22 are arranged at each end of frame 10 and connect legs 11 together, as best shown in FIG. 4. Triangular brace pieces 22' are secured along their edges to both legs 11 and cross-members 22 for adding strength and rigidity thereto. The core drill C includes a power plant 14, cable hoisting mechanism 15 and a drilling head assembly 16, all of conventional construction.

A pair of relatively large skid base members 17 are spaced apart by transversely and upwardly disposed frame members 18 secured thereto. It will be noted that each skid member 17 is formed with upwardly inclined end portions 19', each terminating in an ear 36 formed with an opening for connection to a hook or the like for sliding the skid or for loading the apparatus upon a truck. Each of said frame members 18 is braced adjacent its juncture with skid member 17 by triangular plates 18', each plate being secured along its edges, as by welding, to both its respective skid member 17 and frame member 18.

Fixedly mounted as by welding to the upper surface of the skid members 17 are longitudinally extending channel-ways 19, which receive the runners 12, as best illustrated in FIGURES 1, 3 and 5. The runners 12 slide longitudinally on the channel-ways 19 for moving the drill head assembly 16 either into or out of alignment with the hole 20 in the operation of the drill C.

A hydraulic cylinder 21 is pivotally connected to the cross member 22 of the frame 10 at 23 with its piston rod 24 pivotally connected to a bracket 25 mounted centrally on the frame members 18, forming part of the base members 17.

Referring to FIGURE 8, hydraulic fluid for operating the cylinder 21 is taken from a conventional hydraulic supply pressure manifold 26 forming part of the core drill C. The hydraulic cylinder 21 receives its operating hydraulic fluid under pressure from the manifold 26, through the pipe 27. A hand operated control valve 29 moved by the operation of the handle 29' directs the hydraulic fluid either through the pipe 30 or through the pipe 31, depending on the direction in which the piston is to be moved within the cylinder 21. Valve 29 may be of the conventional two-way type, whereupon direction of fluid into one end of cylinder 21 will automatically vent the opposite end thereof.

In some cases it may be desirable to have a regulating by-pass valve 28 and by-pass line 28' connected to the line 27 for by-passing the control valve 29. The valve 28 is provided to completely shut off the fluid to the control valve 29 while other parts of the core drill C are being hydraulically operated.

Means is provided for preventing undesired movement of the runners 12 in the channels 19 of the base members 17. Set screws 32 are threaded through brackets 33 fixedly secured to the channel 19 by any suitable means, as for instance welding. The set screws 32 are threaded through the horizontal portion 34 of the brackets 33 and contact the horizontal member 35, which forms part of the runners 12. When it is desired to hold the core drill C in a fixed position relative to the base members 17, the set screws 32 are tightened down.

I will now describe the operation of this new and improved base B for core drills C. When the machine is set up ready to drill, the set screws 32 are loosened, the frame 10 is brought to the position shown in FIGURES 1 and 2 by the action of the hydraulic cylinder 21. This is done by moving the lever 29' of the valve 29 to the broken line position, FIGURE 8. Hydraulic fluid will flow from the supply manifold 26, through the pipe 27, valve 29, pipe line 30 to force the piston within the cylinder 21 to the left, causing the core drill C to move to the right, as best seen in FIGURE 2.

When it is desired to move the drill C away from the hole 20 to change drills, or to insert casings or any other operation connected with core drilling, the valve 29 is moved from the position shown in a direction to cause hydraulic fluid to flow through the pipe line 31, forcing the piston rod 24 to the right, as seen in FIGURE 3. This will move the core drill C to the left, out of alignment with the hole 20. This operation is done almost instantaneously, whereas before it required several hours each day to move the machine by the manual methods.

The regulating valve 28 is not always necessary, but may be desirable to by-pass the control valve 29 while operating other elements of the machine by the hydraulic pumping system.

Having thus described the preferred embodiment of the invention, it should be understood that numerous other modifications and adaptations may be resorted to without departing from the scope of the appended claims.

What is claimed is:

1. Means for supporting core drills for horizontal adjustment comprising a pair of elongated tubular skid members, each of said skid members being of a diameter to provide a relatively large ground engaging surface and having upwardly inclined ends terminating in hook engageable portions, said skid members being arranged in spaced parallel relation, means rigidly interconnecting and bracing said skid members, a channel member defining a trackway secured to the upper surface portion of each of said skid members and extending lengthwise thereof, a horizontal supporting frame for a vertical core drill, a plurality of legs rigidly secured to and supporting said frame, and a pair of runners secured to the lower ends of said legs and slidably disposed in said trackways.

2. The apparatus as defined in claim 1 wherein there are cross-pieces extending between said skid members and between the legs of said supporting frame, and hydraulically reciprocatable means provided between said cross-pieces of said skid members and said legs for moving said supporting frame along said trackways on said skid members.

3. The apparatus as defined in claim 2 wherein said hydraulically reciprocatable means includes a cylinder and a piston rod projecting through one end thereof, said cylinder being pivotally connected at one end to one of said cross-ipeces and the outer end of the piston rod being pivotally connected to one of the cross-pieces of said supporting frame, and valve means for controlling fluid pressure to either end of said cylinder.

4. The apparatus as defined in claim 1 wherein means are provided on said trackway for releasably securing said runners in longitudinal adjusted position therealong.

References Cited in the file of this patent

UNITED STATES PATENTS

| Re. 7,591 | Rowland | Apr. 3, 1877 |
| 295,325 | Ball | May 18, 1884 |
| 394,420 | Wellman | Dec. 11, 1888 |
| 955,223 | Stout | Apr. 19, 1910 |
| 2,091,860 | Johnston | Aug. 31, 1937 |
| 2,319,512 | Parrish | May 18, 1943 |
| 2,786,691 | Martin | Mar. 26, 1957 |